US010540342B2

(12) United States Patent
Dasari et al.

(10) Patent No.: US 10,540,342 B2
(45) Date of Patent: Jan. 21, 2020

(54) IN-MEMORY TRANSACTION PROCESSING

(71) Applicant: American Express Travel Related Services Company, Inc., New York, NY (US)

(72) Inventors: Srinivas Dasari, Scottsdale, AZ (US); L. N. Moudgal, Phoenix, AZ (US); Venkat Muthusamy, Phoenix, AZ (US); Mike Wirsig, Phoenix, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 278 days.

(21) Appl. No.: 15/589,760

(22) Filed: May 8, 2017

(65) Prior Publication Data

US 2018/0322164 A1 Nov. 8, 2018

(51) Int. Cl.
*G06F 17/30* (2006.01)
*G06F 16/23* (2019.01)
*G06F 16/27* (2019.01)
*G06F 16/18* (2019.01)

(52) U.S. Cl.
CPC ...... *G06F 16/2365* (2019.01); *G06F 16/1873* (2019.01); *G06F 16/27* (2019.01)

(58) Field of Classification Search
CPC .. G06F 16/2365; G06F 16/1873; G06F 16/27; G06F 16/1734; G06F 16/1767; G06F 16/1815; G06F 16/1865; G06F 16/2308; G06F 16/2379; G06F 16/2386; G06F 16/24564; G06F 11/1402; G06F 9/466; G06F 11/1474; G06Q 30/00; G06Q 30/0273; G06Q 30/06
See application file for complete search history.

(56) References Cited

U.S. PATENT DOCUMENTS

| | | | | |
|---|---|---|---|---|
| 8,856,091 B2* | 10/2014 | Wong | ...... | G06F 16/27 707/703 |
| 2005/0192989 A1* | 9/2005 | Adiba | ...... | G06F 16/2365 |
| 2009/0037422 A1* | 2/2009 | Wong | ...... | G06F 16/27 |
| 2011/0010460 A1* | 1/2011 | Lavoie | ...... | G06Q 40/04 709/231 |
| 2014/0122417 A1* | 5/2014 | Horii | ...... | G06F 16/2379 707/607 |
| 2015/0186658 A1* | 7/2015 | Marien | ...... | H04L 9/006 713/165 |
| 2015/0199415 A1* | 7/2015 | Bourbonnais | ...... | G06F 16/273 707/615 |
| 2017/0351585 A1* | 12/2017 | Bourbonnais | ...... | G06F 16/27 |
| 2018/0167492 A1* | 6/2018 | Bonig | ...... | H04L 67/42 |
| 2018/0203913 A1* | 7/2018 | Bourbonnais | ...... | G06F 16/27 |

* cited by examiner

*Primary Examiner* — Greta L Robinson
(74) *Attorney, Agent, or Firm* — Thomas Horstemeyer, LLP

(57) ABSTRACT

The system may be configured to perform operations including receiving a transaction message based on a marker associated with the transaction message; applying a processing module to the transaction message, wherein the processing module is comprised in the processing machine; accessing processing information in the memory in order to execute the processing module; and processing the transaction message by executing the processing module on the transaction message. The transaction message may have been separated from an input file and may represent a transaction between a merchant and a consumer. The marker may represent a transaction characteristic of the transaction message.

20 Claims, 3 Drawing Sheets

IN-MEMORY TRANSACTION PROCESSING

FIELD

The present disclosure generally relates to transaction processing, and more particularly, to in-memory transaction processing.

BACKGROUND

Merchants accepting payments via transaction instruments from consumers (e.g., credit cards) may fulfill the merchant's end of a transaction to a consumer by providing the consumer with a good or service, and subsequently, submit the transaction records to the transaction account acquirer, or other payment processor, for payment. Traditionally, each transaction record received by the acquirer is sent to numerous jobs, and each job performs a specific processing task on the transaction record. Each job accesses one or more databases external to the processing system to complete the processing task, and more than one job may access the same database at separate times to complete the separate tasks. The accessing of external databases, including sometimes the same databases by separate jobs, adds significant processing time for transaction processing. Even a small time lag can have a significant effect when transaction account acquirer is processing tens of thousands of jobs a day.

SUMMARY

A system, method, and article of manufacture (collectively, "the system") are disclosed relating to in-memory transaction processing. In various embodiments, the system may be configured to perform operations including receiving, by a processing machine, a transaction message based on a marker associated with the transaction message; applying, by the processing machine, a processing module to the transaction message, wherein the processing module is comprised in the processing machine; accessing, by the processing machine, processing information in the memory in order to execute the processing module; and processing, by the processing machine, the transaction message by executing the processing module on the transaction message. The transaction message may have been separated from an input file and may represent a transaction between a merchant and a consumer. The marker may represent a transaction characteristic of the transaction message.

In various embodiments, the operations may further comprise producing, by the processing machine, a processed transaction message in response to the processing the transaction message, wherein the processed transaction message comprises the marker; and transmitting, by the processing machine, the processed transaction message to an output pipe associated with the marker and/or to an external destination. In various embodiments, the operations may further comprise determining, by the processing machine, the processing module to apply to the transaction message based on the marker associated with the transaction message.

In various embodiments, the receiving may include receiving the transaction message from an input pipe, and the processing machine may be associated with the input pipe. In various embodiments, the transaction message may be assembled into an output file in response to the transmitting the processed transaction message. In various embodiments, the transaction message may be marked with the marker based on a transaction characteristic of the transaction message prior to the receiving the transaction message in the processing machine.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of various embodiments herein makes reference to the accompanying drawings, which show the exemplary embodiments by way of illustration. While these exemplary embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

Figure 1:
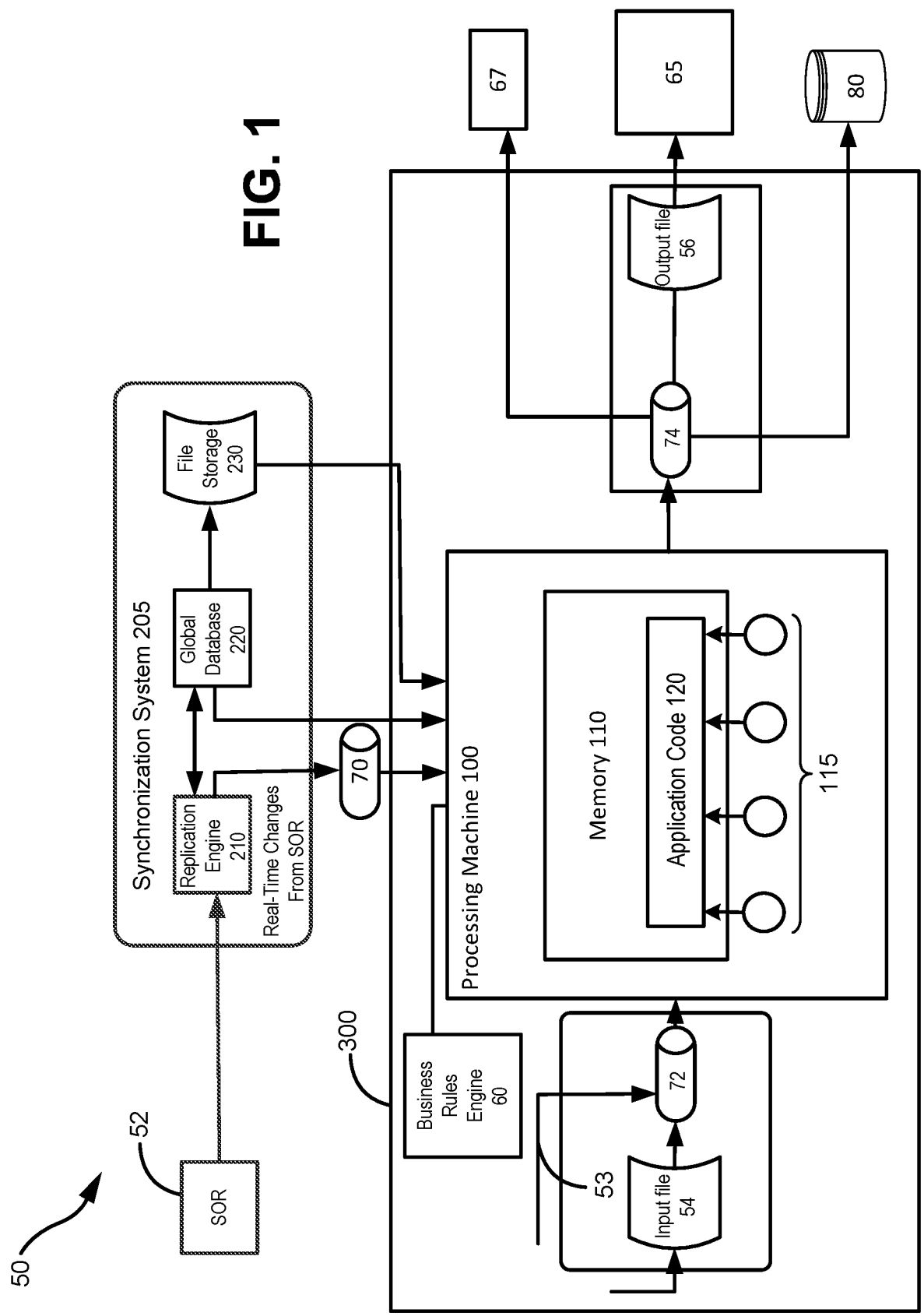
FIG. 1 shows an exemplary system for in-memory transaction processing, in accordance with various embodiments.

With reference to FIG. 1, an exemplary system 50 for in-memory transaction processing is disclosed, in accordance with various embodiments. System 50, in operation, may have the capability to receive files from merchants comprising transaction records (and in some cases, thousands of transaction records), separate each transaction record from the file into transaction messages, and process each transaction message by sending the transaction message to a processing machine (i.e., a computer or node) having all the information necessary for processing stored in the machine's memory. System 50 may be owned and/or utilized, in whole or in part, by a transaction account acquirer looking to fulfill transactions with entities (e.g., merchants) that accept transaction accounts as payment by consumers issued by the transaction account issuer. All resources and information required to process each transaction message received by a processing machine of system 50 are comprised in the memory of the processing machine which receives the transaction message, causing processing time to be faster than processing by accessing information from external databases. System 50 may be computer-based, and may comprise a processor, a tangible non-transitory computer-readable memory, and/or a network interface. Instructions stored on the tangible non-transitory memory may allow system 50 to perform various functions, as described herein.

In various embodiments, system 50 may comprise a synchronization system 205 and an internal system 300 for in-memory transaction processing. Synchronization system 205 may be in communication with internal system 300. In various embodiments, synchronization system 205 may be configured to receive the most recent processing information required for transaction processing and communicate such processing information to internal system 300. Therefore, internal system 300 will have up-to-date information on how to process each file and/or transaction message received by internal system 300. Specifically, synchronization system 205 may be in communication with a processing machine 100 in internal system 300.

In various embodiments, synchronization system 205 may receive information from a statement of record (SOR) 52. SOR 52 may be one or more databases comprising transaction processing information required to process transactions, such as information associated with merchants (e.g., a respective merchant identifier (MID), location, goods or services, transaction terms and conditions, or the like). SOR 52 may be updated periodically or continuously with the most recent changes to processing information. For example, the transaction terms and conditions (e.g., discounts, fees, pay patterns) may have changed for a merchant such that the pay pattern is now five days (i.e., the merchant gets paid for its transactions every five days) rather than three days.

Synchronization system 205 may transmit the most recent transaction processing information to internal system 300, and more specifically, to a memory 110 of processing machine 100 in internal system 300. In various embodiments, synchronization system 205 may comprise a replication engine 210, global database 220, and/or a file storage 230. Replication engine 210 may receive updated processing information from SOR 52, and transmit the select updated processing information (based on the configuration of replication engine 210) to processing machine 100 to provide memory 110 with the most up-to-date processing information. Replication engine 210 may receive the updated processing information and transmit such information to processing machine 100 in real time or near real-time. In various embodiments, replication engine 210 may send updated processing information through an update pipe 70 before such information is transmitted to processing machine 100. Update pipe 70 may be an information storage medium which can store the updated processing information in case internal system 300 and/or processing machine 100 is turned off or not functioning properly during the updating of processing machine 100 by synchronization system 205. In such a case, replication engine 210 may receive updated processing information from SOR 52 and transmit the information to update pipe 70, which update pipe 70 may store. In normal operation, updated processing information is pulled from update pipe 70 by processing machine 100, so if processing machine is off or not functioning correctly, the updated processing information will remain in update pipe 70. In response to internal system 300 and/or processing machine 100 resuming normal or adequate operation, update pipe 70 may transmit the updated information to processing machine 100 to be stored in memory 110.

Global database 220 may be a database in communication with SOR 52 (e.g., through an API connecting global database 20 with SOR 52). Global database 220 may directly read the updated processing information on SOR 52 via the connection between global database 20 and SOR 52, and transmit the updated processing information to processing machine 100. Global database 220 may be utilized under circumstances in which replication engine 210 is not functioning, or not providing adequate updated processing information. For example, if replication engine 210 is not providing updated processing information fast enough to processing machine 100 to process one or more transaction messages, global database 220 may directly read the updated processing information from SOR 52 to provide processing machine 100 with the most recent processing information. Similarly, processing machine 100 may detect that certain processing information is missing from memory 110, or that certain processing information is stale (e.g., more than a day old). In response, processing machine 100 may pull updated processing information from global database 220. In various embodiments, every time processing machine 100 and/or memory 110 received updated processing information, the updated processing information is timestamped with the date and time received.

File Storage 230 may be a database comprising updated processing information received from SOR 52. Under circumstances in which internal system 300 and/or processing machine 100 is being powered on for the first time or after an outage during which processing machine 100 was unable to receive updated processing information (i.e., booting up), processing machine 100 may access and receive the updated processing information stored in file storage 230 as a way to bulk load internal system 300 and/or processing machine 100. While receiving the processing information from file storage 230, processing machine 100 may ignore any updated processing information having a timestamp older than the last time processing machine 100 received updated processing information from replication engine 210 and/or global database 220. Accordingly, replication engine 210, global database 220, and/or file storage 230 may work in conjunction or as alternatives to one another at various times and under various circumstances.

In various embodiments, like system 50, internal system 300 may be computer-based, and may comprise a processor, a tangible non-transitory computer-readable memory, and/or a network interface. Instructions stored on the tangible non-transitory memory may allow internal system 300 to perform various functions, as described herein. Internal system 300 may comprise an input file 54, a business rules engine 60, processing machine 100, and/or an output file 56. Input file 54 may be received by internal system 300 from an entity utilizing system 50 and/or internal system 300 (e.g., a merchant) for transaction processing. Input file 54 may comprise merchant information (e.g., a merchant identifier, merchant account, location, or the like) identifying the merchant and one or more transaction records. Each transaction record in input file 54 may be a record of a transaction between a merchant and a consumer, and may comprise transaction information (i.e., transaction characteristics) of the transaction. For example, a transaction record may comprise transaction information/characteristics such as the merchant identifier, a transaction account identifier associated with the consumer, a transaction date, time, monetary amount, location, and/or the like. Each transaction record is associated with input file 54.

Figure 2:
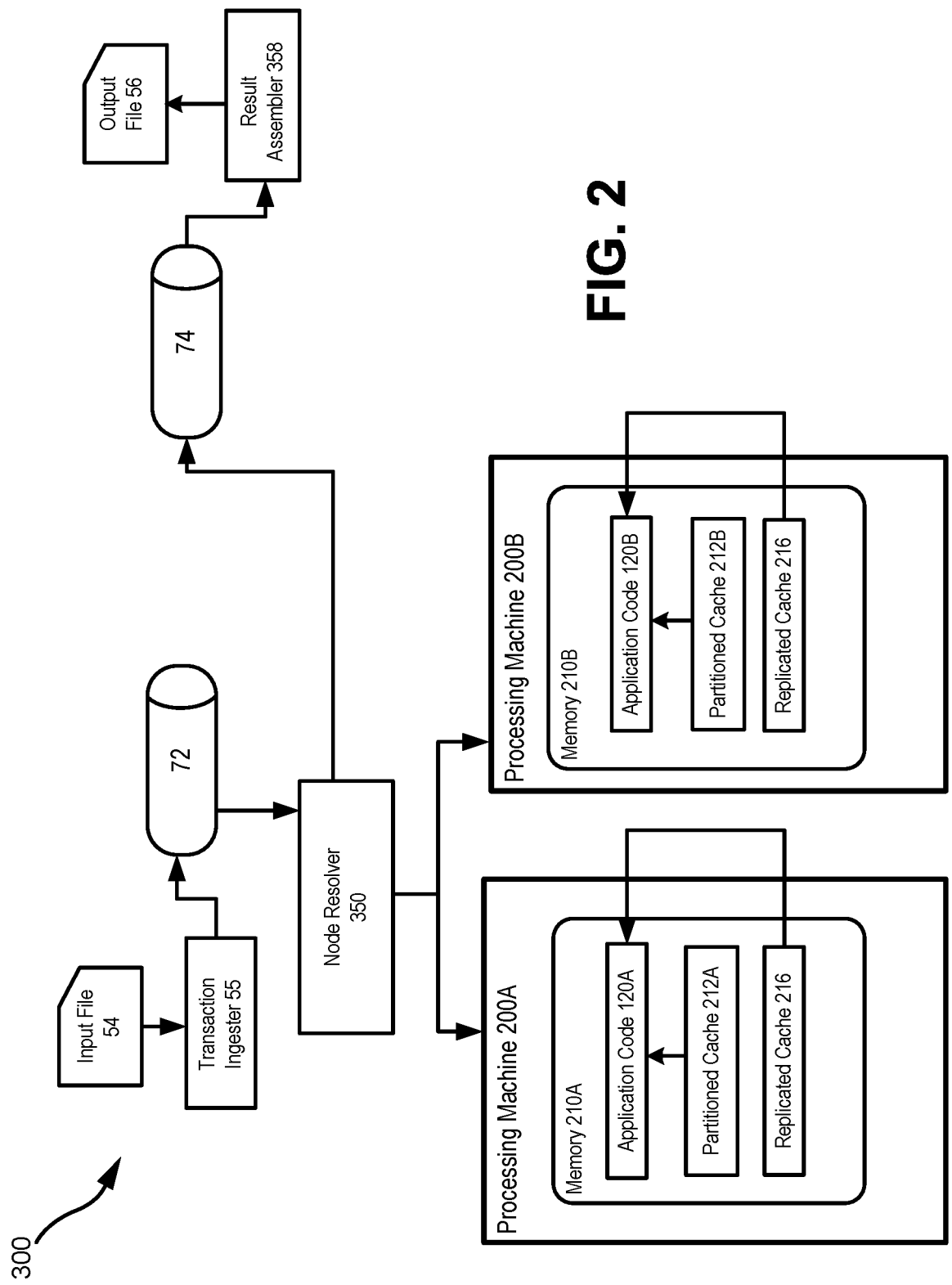
FIG. 2 shows an exemplary internal system for in-memory transaction processing, in accordance with various embodiments.

In various embodiments, with combined reference to FIGS. 1 and 2, input file 54 may be transmitted to transaction ingester 55. Transaction ingester 55 may separate the transaction records from input file 54 and/or the other transaction records in (or that were comprised in) input file 54, such that the transaction records are not comprised in input file 54. Transaction ingester 55 may identify each discrete transaction record in input file 54 based on the transaction date, time, monetary amount, transaction account identifier, and/or the like, and divide each discrete transaction record from input file 54. Transaction records separated from the respective input file 54 may be referred to as "transaction messages." The transaction messages may be transmitted to processing machine 100 for processing. In various embodiments, transaction ingester 55 may be configured to mark each transaction message with a marker associated with the merchant (e.g., merchant identifier), and/or markers associated other transaction characteristics of the transaction message (e.g., transaction account identifier associated with the consumer, a transaction date, time, monetary amount, location, and/or the like). Additionally, each transaction message may receive a file marker associated with the input file 54 from which the transaction message came. Markers for a transaction message may be determined and/or assigned by transaction ingester 55 based on a configuration data set. The configuration data set used to determine marker categories for a transaction message may be selected based on various components of the name of the input file 54 (e.g., prefix and/or suffix), and/or other input file characteristics. Therefore, transaction messages from different input files 54 may be marked differently.

In various embodiments, internal system 300 may comprise an input pipe 72, through which transaction messages may travel in response to being transmitted from input file 54 to processing machine 100. Input pipe 72 may be a storage medium that stores the transaction messages from input file 54. Input pipe 72 may receive transaction messages having only certain markers on the transaction messages. As one can appreciate, internal system 300 may receive multiple input files 54, and internal system 300 may also comprise multiple input pipes 72. Each input pipe may receive transaction messages only having markers associated with certain transaction characteristics. For example, a first input pipe 72 may only receive transaction messages having a first marker associated with a first merchant (or a first transaction account identifier, or first transaction date, etc.), and a second input pipe 72 may only receive transaction messages having a second marker associated with a second merchant (or a second transaction account identifier, or second transaction date, etc.). Transaction messages having the first marker may come from a different input file 54 than transaction messages having the second marker.

In various embodiments, internal system 300 may comprise more than one processing machine 100 (e.g., first processing machine 200A and second processing machine 200B). Each input pipe 72 may be associated with at least one processing machine 100. For example, as depicted in FIG. 2, first processing machine 200A and second processing machine 200B may be associated with input pipe 72 (i.e., transaction messages received in input pipe 72 may be transmitted to first processing machine 200A and/or second processing machine 200B). In various embodiments, multiple input pipes 72 may be associated with one processing machine 100.

In various embodiments in which one processing machine 100 is associated with an input pipe 72, transaction messages received by input pipe 72 may be transmitted to the associated processing machine 100 for processing. In various embodiments in which more than one processing machine 100 is associated with an input pipe 72, to determine to which processing machine 100 a transaction message should be transmitted, internal system 300 may comprise a node resolver 350 associated with an input pipe 72. Node resolver 350 may comprise hardware and/or software capable of storing data and/or analyzing information. Node resolver 350 may comprise a server appliance running a suitable server operating system (e.g., any JAVA Virtual Machine running on LINUX or WINDOWS) and having database software (e.g., GRIDAGAIN, HAZELCAST, SAP HANA) installed thereon. Node resolver 350 may receive a transaction message from an input pipe 72 and determine which processing machine 100 should receive the transaction message based on the markers on the transaction message. For example, first processing machine 200A may be configured to process transaction messages associated with a first merchant, and second processing machine 200B may be configured to process transaction messages associated with a second merchant. Therefore, node resolver 350 may analyze received transaction messages and transmit transaction messages with markers associated with the first merchant to first processing machine 200A, and transaction messages with markers associated with the second merchant to second processing machine 200B.

In various embodiments, with reference to FIG. 1, internal system 300 may comprise processing machine 100, which is configured to process one or more transaction messages. Processing machine 100 may comprise hardware and/or software capable of storing data and/or analyzing information. Processing machine 100 may comprise a server appliance running a suitable server operating system (e.g., any JAVA Virtual Machine running on LINUX or WINDOWS) and having database software (e.g., GRIDAGAIN, HAZELCAST, SAP HANA) installed thereon. The database software may be comprised in memory 110 of processing machine 100.

With combined reference to FIGS. 1 and 2, in various embodiments, internal system 300 may comprise more than one processing machine 100, such as first processing machine 200A and second processing machine 200B. Each processing machine 100 in internal system 300 may comprise partitioned cache (e.g., partitioned cache 212A of first processing machine 200A, and partitioned cache 212B of second processing machine 200B) and replicated cache 216 within the memory 110 of the processing machine (e.g., first memory 210A of first processing machine 200A, and second memory 210B of second processing machine 200B). Replicated cache 216 and/or the partitioned cache may be periodically and/or continuously updated by synchronization system 205 providing updated processing information, as described herein. Replicated cache 216 may be processing information comprised in the memory 110 of every processing machine 100 in internal system 300. Replicated cache 216 may be processing information which will be necessary for the processing of any transaction message regardless of the associated merchant or any other transaction characteristic (e.g., processing information related to confirming or validating the date and time of the transaction, the monetary amount, the transaction account used, etc.).

Partitioned cache in memory 110 of a processing machine 100 (e.g., partitioned cache 212A of first processing machine 200A, and partitioned cache 212B of second processing machine 200B) may be processing information specific to a merchant or other transaction characteristic. For example, first processing machine 200A may be configured to process transaction messages associated with a first merchant. Therefore, partitioned cache 212A may comprise processing information specific to the first merchant (e.g., discounts, payment schedule, fees, etc. specific to the first merchant), which may not be comprised in second memory 210B. Synchronization system 205 may transmit partitioned cache to its respective processing machine 100 based on a merchant identifier associated with the partitioned cache and the processing machine 100 (i.e., the processing machine 100 may have a marker indicating the merchant for which the processing machine 100 processes transaction messages (e.g., a merchant identifier associated with the merchant), and the partitioned cache transmitted to the processing machine 10 0 may have the same marker).

Processing machine 100 may further comprise application code 120 and one or more processing modules 115. Application code 120 and/or processing module 115 may be comprised in memory 110. Each processing module 115 in processing machine 100 may have a specific function for processing a transaction message. For example, a first processing module 115 may be a pricing module, which may determine the monetary amount of the transaction message being processed; a second processing module 115 may be a discount/fee module, which may determine a discount or fee to be applied to the merchant based on the transaction terms agreed upon between the transaction account issuer and the merchant; a third processing module 115 may be a risk assessment module which may determine the risk that a transaction of a transaction message is fraudulent; a fourth processing module 115 may be a payment scheduling module which determines the schedule in which the merchant should be paid based on the transaction terms agreed upon between the transaction account issuer and the merchant; and/or the like. There may be any number of processing modules 115 in a processing machine 100 such that all transaction messages transmitted to a processing machine 100 may be adequately processed (i.e., all aspects of the transaction messages are confirmed and/or validated). All processing modules 115 may be stored on processing machine 100 (and in various embodiments, in memory 110) that are required to process all transaction messages that will be received by processing machine 100.

In various embodiments, internal system 300 may comprise a business rules engine 60 in communication with a processing machine 100. Business rules engine 60 may comprise hardware and/or software capable of storing data and/or analyzing information. Business rules engine 60 may comprise a server appliance running a suitable server operating system (e.g., any JAVA Virtual Machine running on LINUX or WINDOWS) and having database software (e.g., GRIDAGAIN, HAZELCAST, SAP HANA) installed thereon. In various embodiments, each processing machine 100 and/or memory 110 may comprise a business rules engine 60. In various embodiments, transaction messages having different transaction characteristics may be transmitted to the same processing machine 100, and therefore, different transaction messages may include the application of different processing modules 115 in order for each transaction message to be correctly processed. Business rules engine 60 may be configured to determine which processing modules 115 should be applied to each transaction message to be processed by the processing machine 100. For example, a transaction message may comprise a marker indicating a transaction characteristic of the transaction message, and based on the marker, business rules engine 60 may instruct processing machine 100 to apply certain processing modules 115 to the transaction message. In various embodiments, all transaction messages from a merchant sent to a processing machine 100 may require the same processing modules 115 for processing. In various embodiments, one or more transaction messages of the transaction messages sent to a processing machine 100 may require a different number and/or combination of processing modules 115 for processing.

In various embodiments, application code 120 may be in communication with processing modules 115, and may apply and execute the required processing modules 115 to the transaction message (which may be determined by business rules engine) in order to process the transaction message. Application code 120 may access and retrieve the processing information from memory 110 (as depicted in FIG. 2, application code 120A and 120B may access replicated cache 216 and/or partitioned cache 212A and 212B, respectively) required for each processing module 115 that will be applied to a transaction message in order to process the transaction message. As discussed above, memory 110 may comprise all processing information required for the application and execution of every processing module 115 being applied to a transaction message received by processing machine 100 for processing.

In various embodiments, one processing machine in internal system 300 may communicate with another processing machine in internal system 300 to process a transaction message. Processing information on two processing machines 100 may be required to process a single transaction message. For example, one transaction request may be received from a merchant that is part of a chain, but separately owned from the corporate owners (e.g., a franchise). The merchant may have a first merchant identifier, causing its transaction messages to receive a first marker from transaction ingester 55. Therefore, transaction messages from the merchant may go to first processing machine 200A comprising processing information in first memory 210A and/or partitioned cache 212A specific to the merchant. However, transaction messages from the merchant may also be subject to the same terms and conditions with the account issuer as the corporate owner, but the processing information for the corporate owner may be comprised in second memory 210B and/or partitioned cache 212B of second processing machine 200B. Therefore, first processing machine 200A and/or the processing modules 115 required to process the transaction messages may access the processing information and/or processing modules 115 on second memory 210B of second processing machine 200B in order to completely process the transaction messages from the merchant.

In response to the completion of the application and execution of all processing modules 115 required to process a transaction message, processing machine 100 may produce a processed transaction message. The processed transaction files may be transmitted to a result assembler 358, which may be configured to identify the markers on each processed transaction file, and compile all processed transaction messages having like markers identifying the input file 54 of origin. Result assembler 358 may assemble all processed transaction messages having like markers identifying the input file 54 of origin into an output file 54. Result assembler 358 may identify that all processed transaction messages have been received for an output file by the markers associated with the transaction messages, which may indicate the number of transaction messages that were comprised in the original input file 54 received by internal system 300.

In various embodiments, the processed transaction messages may be transmitted to an output pipe 74 prior to being received by result assembler 358. Output pipe 74 may be a storage medium that stores processed transaction messages received from processing machine 100. Internal system 300 may comprise one or more output pipes 74, and each output pipe 74 may be associated with a certain markers (i.e., certain transaction characteristics), such that each output pipe 74 receives processed transaction messages having those certain markers. Accordingly, each output pipe 74 may receive processed transaction messages having the same markers (i.e., a certain transaction characteristics) as the respective input pipe 72. One processing machine 100 may transmit the processed transaction messages produced to one output pipe 74 associated with the processing machine 100, or may transmit the processed transaction messages produced to one of multiple output pipes 74 associated with the processing machine 100. In various embodiments, an output pipe 74 may receive processed transaction requests from multiple processing machines 100.

In various embodiments, in response to all transaction messages which were separated from input file 54 being processed into processed transaction messages and transmitted to output pipe 74, output pipe 74 may transmit the processed transaction messages to result assembler 358 to assemble into an output file 54. In various embodiments, output pipe 74 may transmit processed transaction messages to result assembler 358 as they are received by output pipe 74.

In general, in operation, each input file 54 is broken down into transaction messages, which are sent to their respective input pipe 72 and/or processing machine 100 based on markers comprised in the transaction messages, input pipes 72, and/or processing machines 100 for processing. Processed transaction messages are then reassembled by result assembler 358 into an output file 56. In various embodiments, processing machine 100 and/or another component of internal system 300 may assemble the processed transaction messages into an output file 56 without transmitting the processed transaction files to output pipe 74.

In various embodiments, output file 56 may be transmitted to an external destination outside of internal system 300 to utilize output file 56. The external destination may be a mainframe 65 to store, utilize, and/or process output file and the associated. In various embodiments, individual processed transaction messages may be transmitted directly from processing machine 100 and/or output pipe 74 to an external destination such as a database 80 to store processed transaction messages and associated information, and/or directly to a merchant or other entity 67 for further processing and/or utilization.

Figure 3:
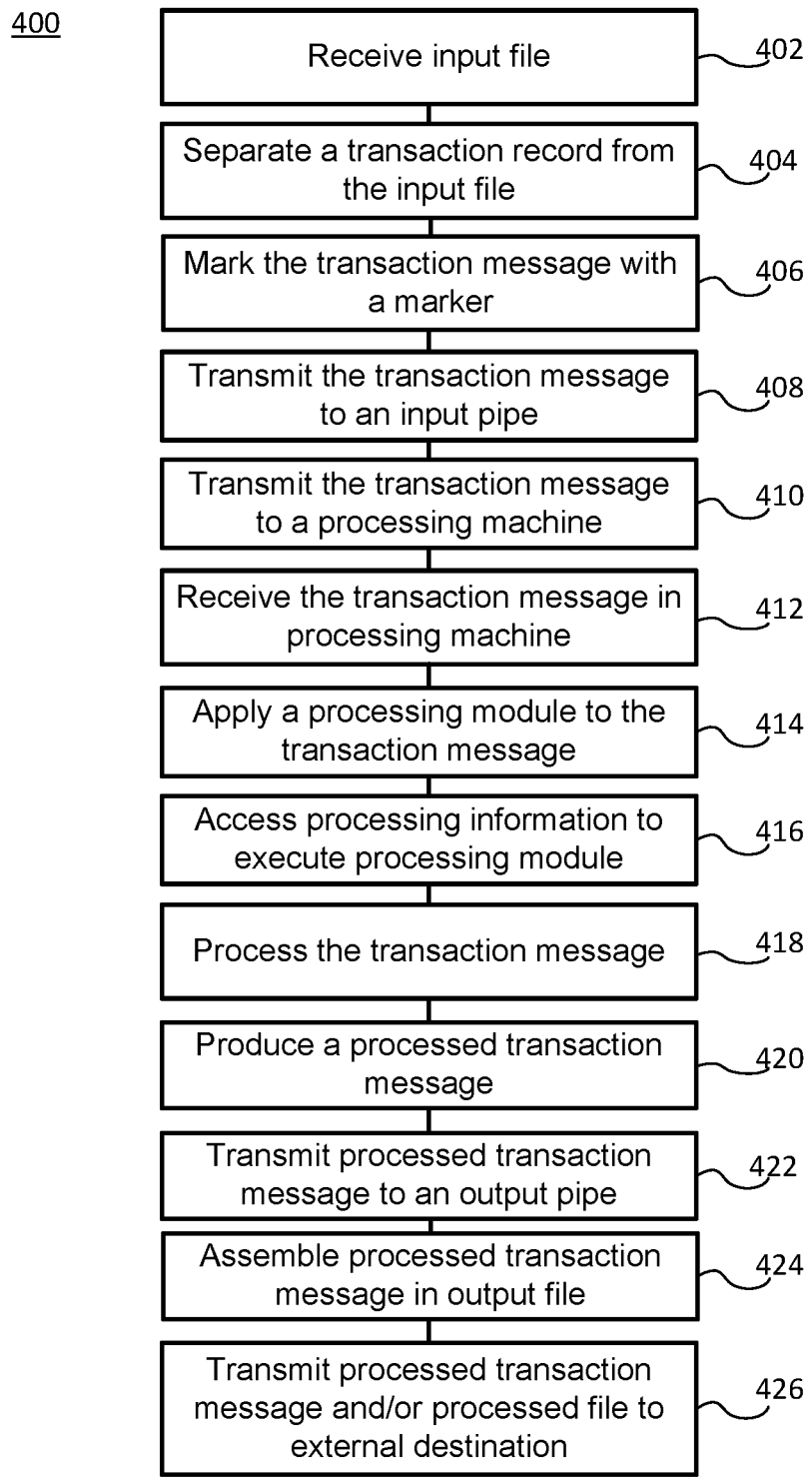
FIG. 3 shows a flowchart depicting an exemplary method for processing transactions using in-memory transaction processing, in accordance with various embodiments.

With respect to FIG. 3, the process flow depicted is merely an embodiment of various embodiments, and is not intended to limit the scope of the disclosure. For example, the steps recited in any of the method or process descriptions may be executed in any order and are not limited to the order presented. It will be appreciated that the description herein makes appropriate references not only to the steps and consumer interface elements depicted in FIG. 3, but also to the various system components as described above with reference to FIGS. 1 and 2.

In accordance with various embodiments, FIG. 3 depicts a method 400 for processing transactions using in-memory transaction processing, such as the transaction processing occurring by operation of system 50 and/or internal system 300. In accordance with various embodiments, with combined reference to FIGS. 1-3, system 50 and/or internal system 300 may receive an input file 54 (step 402) from a merchant or other entity. System 50 and/or internal system 300 may receive multiple input files 54 from multiple merchants. An input file 54 may comprise one or more transaction records, wherein each transaction record reflects a transaction between the merchant and a consumer. Each transaction record may comprise various transaction characteristics of the respective transaction between the merchant and the consumer, such as the merchant identifier, a transaction account identifier associated with the consumer, a transaction date, time, monetary amount, location, and/or the like. Input file 54 may be transmitted to transaction ingester 55, which may separate the transaction records from input file 54 (step 404) and from other transaction records from input file 54. Transaction records separated from the respective input file 54 may be referred to as "transaction messages."

In various embodiments, transaction ingester 55 may mark each transaction message with a marker (step 406) identifying a transaction characteristic of the transaction message (e.g., a merchant identifier, transaction account identifier associated with the consumer, a transaction date, time, monetary amount, location, and/or the like). For example, input file 54 may be received from a first merchant, and therefore, every transaction message coming from input file 54 may receive a marker associated with the first merchant (i.e., a merchant identifier for the first merchant).

In various embodiments, the transaction messages may be transmitted to an input pipe 72 (step 408). As described herein, internal system 300 may comprise one or more input pipes 72, and each input pipe 72 may be configured to receive transaction messages with certain markers. Going along with the example above, the transaction messages comprising the marker associated with the first merchant may be sent to a first input pipe 72 configured to receive transaction messages from the first merchant. Other transaction messages not comprising the first merchant marker may be sent to other input pipes 72 in internal system 300.

In various embodiments, the transaction messages may be transmitted to processing machine 100 (step 410), and processing machine 100 may receive the transaction messages (step 412). The transaction machines may be transmitted directly from transaction ingester 55 or from an input pipe 72. In various embodiments, transaction messages may be transmitted directly to input pipe 72 and/or processing machine 100 from a merchant by direct route 53. In such embodiments, merchants may submit individual transaction messages to internal system 300. Internal system 300 may comprise one or more processing machines 100, wherein each processing machine 100 is configured to receive and process transaction messages having certain transaction characteristics. For example, first processing machine 200A may be configured to receive transaction messages from the first merchant because first memory 210A may comprise processing information related to the first merchant. Processing information related to the first merchant may be stored in partitioned cache 212A Therefore, transaction ingester 55 and/or a first input pipe 72 may transmit transaction messages having a first merchant marker to first processing machine 200A. Transaction messages from other merchants may also be transmitted to first processing machine 200A if first memory 210A has processing information for those merchants, or transaction messages from other merchants may be transmitted to another processing machines, such as second processing machine 200B, having the required processing information stored in the memory 110. In various embodiments, node resolver 350 may receive each transaction message, identify the markers on each transaction message, determine which processing machine 100 of internal system 300 is appropriate for processing each transaction message, and transmit each transaction message to the appropriate processing machine 100. In various embodiments, a transaction message may be sent to two processing machines 100

Based on markers of the transaction messages received by processing machine 100, one or more processing modules 115 may be applied to the transaction messages (step 414). The processing modules 115 applied to the transaction messages may be identified and/or determined by business rules engine 60. Business rules engine 60 may recognize transaction characteristics of each transaction message received by a processing machine 100 by identifying markers on each transaction message. Based on pre-defined logic within business rules engine 60, business rules engine 60 may determine which processing modules 115 should be applied to which transaction message. For example, a first transaction message from the first merchant may need a discount/fee processing module 115 to be applied because of the monetary amount or date of transaction, while a second transaction message from the first merchant may require a different processing module 115, such as any one or more of those described herein, for example.

Application code 120 may execute the processing modules 115 to be applied to a transaction message by accessing processing information stored in memory 110 (step 416). Application code 120 may retrieve the most recent processing information from memory 110, which may have been updated by synchronization system 205 implementing any of the updating methods described herein. For example, for application and execution of a discount/fee processing module 115 on the first transaction message, application code 120 may access memory 110 and retrieve the updated processing information relating to any discounts and/or fees for the merchant from which the transaction message came. All processing modules 115 required to process the transaction messages in the appropriate processing machine 100 are comprised in the processing machine, and all processing information required to apply and execute the appropriate processing modules 115 is stored in memory 110. Therefore, application code 120 and/or processing modules 115 do not have to access external databases for the processing information (i.e., database processing), therefore, allowing in-memory processing of all transaction messages in processing machines 100. Such in-memory processing greatly decreases the transaction processing time compared to database processing.

The application and execution of the appropriate processing modules 115 by application code 120 on a transaction message may process the transaction message (step 418). For example, processing the transaction message may comprise confirming or validating the date and time of the transaction, the monetary amount, the transaction account used, applying any discounts/fees, determining a payment date, and/or the like, all of which may be completed by the application and execution of one or more processing modules 115. In response to all appropriate processing modules 115 being applied to and executed on a transaction message, processing that transaction message may be complete, producing a processed transaction message (step 420).

In various embodiments, the processed transaction message may be transmitted to an output pipe 74 (step 422). System 50 and/or internal system 300 may comprise one or more output pipes 74, wherein each output pipe 74 is configured to receive processed transaction messages having certain markers (i.e., transaction characteristics). Output pipe 74 may be capable of storing processed transaction messages.

In various embodiments, the processed transaction messages may be transmitted to result assembler 358 for assembly into an output file 56. The processed transaction messages may be transmitted to result assembler 358 directly from processing machine 100, and/or from output pipe 74. Result assembler may assemble all processed transaction messages received having a marker indicating a common input file 54 of origin into an output file 56 (step 424). Output file 56 may be transmitted to an external destination (step 426) such as a mainframe 65 to store, utilize, and/or process output file and the associated information. In various embodiments, individual processed transaction messages may be transmitted directly from processing machine 100 and/or output pipe 74 to an external destination (step 426), such as a database 80 to store processed transaction messages and associated information, and/or directly to a merchant or other entity 67 for further processing and/or utilization. The external destination may be determined based on the transaction characteristics of the processed transaction message reflected in the markers on the processed transaction message.

The disclosure and claims do not describe only a particular outcome of in-memory transaction processing, but the disclosure and claims include specific rules for implementing the outcome of in-memory transaction processing and that render information into a specific format that is then used and applied to create the desired results of in-memory transaction processing, as set forth in *McRO, Inc.* v. *Bandai Namco Games America Inc.* (Fed. Cir. case number 15-1080, Sep. 13, 2016). In other words, the outcome of in-memory transaction processing can be performed by many different types of rules and combinations of rules, and this disclosure includes various embodiments with specific rules. While the absence of complete preemption may not guarantee that a claim is eligible, the disclosure does not sufficiently preempt the field of in-memory transaction processing at all. The disclosure acts to narrow, confine, and otherwise tie down the disclosure so as not to cover the general abstract idea of just in-memory transaction processing. Significantly, other systems and methods exist for in-memory transaction processing, so it would be inappropriate to assert that the claimed invention preempts the field or monopolizes the basic tools of in-memory transaction processing. In other words, the disclosure will not prevent others from in-memory transaction processing, because other systems are already performing the functionality in different ways than the claimed invention. Moreover, the claimed invention includes an inventive concept that may be found in the non-conventional and non-generic arrangement of known, conventional pieces, in conformance with *Bascom* v. *AT&T Mobility,* 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information (i.e., in a display of a processed transaction message and/or output file 56) of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., transaction messages and/or email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant arts how to implement the disclosure in alternative embodiments.

As used herein, "satisfy", "meet", "match", "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input and/or any other method known in the art.

The customer may be identified as a customer of interest to a merchant based on the customer's transaction history at the merchant, types of transactions, type of transaction account, frequency of transactions, number of transactions, lack of transactions, timing of transactions, transaction history at other merchants, demographic information, personal information (e.g., gender, race, religion), social media or any other online information, potential for transacting with the merchant and/or any other factors.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

A transaction record may comprise any transaction or transaction information. The transaction record may be a unique identifier associated with a transaction. Transaction record data includes important information and enhanced data. For example, a transaction record may contain transaction information such as location, merchant name or identifier, transaction amount, transaction date, account number, account security pin or code, account expiry date, and the like for the transaction. Such enhanced data increases the accuracy of matching the transaction data to the receipt data. Such enhanced transaction information is NOT equivalent to transaction entries from a banking statement or transaction account statement, which is very limited to basic data about a transaction. Furthermore, a transaction record is provided by a different source, namely the transaction record is provided by the merchant to the transaction processor (e.g., a transaction account acquirer). In that regard, the transaction record is a unique identifier associated with a particular transaction. A transaction record is often associated with a Summary of Charges (SOC). The transaction records and SOCs include information provided by the merchant to the transaction processor, and the transaction records and SOCs are used in the settlement process with the merchant. A transaction may, in various embodiments, be performed by a one or more members using a transaction account, such as a transaction account associated with a gift card, a debit card, a credit card, and the like.

Distributed computing cluster may be, for example, a Hadoop® cluster configured to process and store big data sets with some of nodes comprising a distributed storage system and some of nodes comprising a distributed processing system. In that regard, distributed computing cluster may be configured to support a Hadoop® distributed file system (HDFS) as specified by the Apache Software Foundation at http://hadoop.apache.org/docs/. For more information on big data management systems, see U.S. Ser. No. 14/944,902 titled INTEGRATED BIG DATA INTERFACE FOR MULTIPLE STORAGE TYPES and filed on Nov. 18, 2015; U.S. Ser. No. 14/944,979 titled SYSTEM AND METHOD FOR READING AND WRITING TO BIG DATA STORAGE FORMATS and filed on Nov. 18, 2015; U.S. Ser. No. 14/945,032 titled SYSTEM AND METHOD FOR CREATING, TRACKING, AND MAINTAINING BIG DATA USE CASES and filed on Nov. 18, 2015; U.S. Ser. No. 14/944,849 titled SYSTEM AND METHOD FOR AUTOMATICALLY CAPTURING AND RECORDING LINEAGE DATA FOR BIG DATA RECORDS and filed on Nov. 18, 2015; U.S. Ser. No. 14/944,898 titled SYSTEMS AND METHODS FOR TRACKING SENSITIVE DATA IN A BIG DATA ENVIRONMENT and filed on Nov. 18, 2015; and U.S. Ser. No. 14/944,961 titled SYSTEM AND METHOD TRANSFORMING SOURCE DATA INTO OUTPUT DATA IN BIG DATA ENVIRONMENTS and filed on Nov. 18, 2015, the contents of each of which are herein incorporated by reference in their entirety.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE® TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any parts or functions thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross-over bar, or network). Various software embodiments are described in terms of this exemplary computer system. After reading this description, it will become apparent to a person skilled in the relevant arts how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant arts.

In various embodiments, the server may include application servers (e.g. WEB SPHERE, WEB LOGIC, JBOSS, EDB® Postgres Plus Advanced Server® (PPAS),etc.). In various embodiments, the server may include web servers (e.g. APACHE, IIS, GWS, SUN JAVA® SYSTEM WEB SERVER, JAVA Virtual Machine running on LINUX or WINDOWS).

In various embodiments, components, modules, and/or engines of system 50 and/or internal system 300 may be implemented as micro-applications or micro-apps. Micro-apps are typically deployed in the context of a mobile operating system, including for example, a WINDOWS® mobile operating system, an ANDROID® Operating System, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, entertainment, data, offer, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, blockchain, object-oriented structure and/or any other database configurations. Common database products that may be used to implement the databases include DB2 by IBM® (Armonk, N.Y.), various database products available from GRIDAGAIN, HAZELCAST, SAP HANA® Corporation (Redwood Shores, Calif.), MICROSOFT® Access® or MICROSOFT® SQL Server® by MICROSOFT® Corporation (Redmond, Wash.), My SQL by My SQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure.

The blockchain structure may include a distributed database that maintains a growing list of data records. The blockchain may provide enhanced security because each block may hold individual transactions and the results of any blockchain executables. Each block may contain a timestamp and a link to a previous block. Blocks may be linked because each block may include the hash of the prior block in the blockchain. The linked blocks form a chain, with only one successor block allowed to link to one other predecessor block.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (ITS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, GRIDAGAIN, HAZELCAST, SAP HANA®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE MQTM (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT, JAVASCRIPT Object Notation (JSON), VB Script, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®; and/or any other suitable and/or desired module.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet®, Veriphone®, Discover Card®, PayPal®, ApplePay®, GooglePay®, private networks (e.g., department store networks), and/or any other payment networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a stand alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases and terms similar to a "party" may include any individual, consumer, customer, group, business, organization, government entity, transaction account issuer or processor (e.g., credit, charge, etc), merchant, consortium of merchants, account holder, charitable organization, software, hardware, and/or any other type of entity. The terms "user," "consumer," "purchaser," and/or the plural form of these terms are used interchangeably throughout herein to refer to those persons or entities that are alleged to be authorized to use a transaction account.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies. For more information regarding NFC, refer to the following specifications all of which are incorporated by reference herein: ISO/IEC 18092/ECMA-340, Near Field Communication Interface and Protocol-1 (NFCIP-1); ISO/IEC 21481/ECMA-352, Near Field Communication Interface and Protocol-2 (NFCIP-2); and EMV 4.2 available at http://www.emvco.com/default.aspx).

The account number may be distributed and stored in any form of plastic, electronic, magnetic, radio frequency, wireless, audio and/or optical device capable of transmitting or downloading data from itself to a second device. A consumer account number may be, for example, a sixteen-digit account number, although each credit provider has its own numbering system, such as the fifteen-digit numbering system used by American Express. Each company's account numbers comply with that company's standardized format such that the company using a fifteen-digit format will generally use three-spaced sets of numbers, as represented by the number "0000 000000 00000". The first five to seven digits are reserved for processing purposes and identify the issuing bank, account type, etc. In this example, the last (fifteenth) digit is used as a sum check for the fifteen digit number. The intermediary eight-to-eleven digits are used to uniquely identify the consumer. A merchant account number may be, for example, any number or alpha-numeric characters that identify a particular merchant for purposes of account acceptance, account reconciliation, reporting, or the like.

In various embodiments, an account number may identify a consumer. In addition, in various embodiments, a consumer may be identified by a variety of identifiers, including, for example, an email address, a telephone number, a cookie id, a radio frequency identifier (RFID), a biometric, and the like.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

The terms "payment vehicle," "financial transaction instrument," "transaction instrument" and/or the plural form of these terms may be used interchangeably throughout to refer to a financial instrument.

Phrases and terms similar to "merchant," "supplier" or "seller" may include any entity that receives payment or other consideration. For example, a supplier may request payment for goods sold to a buyer who holds an account with a transaction account issuer.

Phrases and terms similar to a "buyer" may include any entity that receives goods or services in exchange for consideration (e.g. financial payment). For example, a buyer may purchase, lease, rent, barter or otherwise obtain goods from a supplier and pay the supplier using a transaction account.

Phrases and terms similar to "internal data" may include any data a credit issuer possesses or acquires pertaining to a particular consumer. Internal data may be gathered before, during, or after a relationship between the credit issuer and the transaction account holder (e.g., the consumer or buyer). Such data may include consumer demographic data. Consumer demographic data includes any data pertaining to a consumer. Consumer demographic data may include consumer name, address, telephone number, email address, employer and social security number. Consumer transactional data is any data pertaining to the particular transactions in which a consumer engages during any given time period. Consumer transactional data may include, for example, transaction amount, transaction time, transaction vendor/merchant, and transaction vendor/merchant location. Transaction vendor/merchant location may contain a high degree of specificity to a vendor/merchant. For example, transaction vendor/merchant location may include a particular gasoline filing station in a particular postal code located at a particular cross section or address. Also, for example, transaction vendor/merchant location may include a particular web address, such as a Uniform Resource Locator ("URL"), an email address and/or an Internet Protocol ("IP") address for a vendor/merchant. Transaction vendor/merchant, and transaction vendor/merchant location may be associated with a particular consumer and further associated with sets of consumers. Consumer payment data includes any data pertaining to a consumer's history of paying debt obligations. Consumer payment data may include consumer payment dates, payment amounts, balance amount, and credit limit. Internal data may further comprise records of consumer service calls, complaints, requests for credit line increases, questions, and comments. A record of a consumer service call includes, for example, date of call, reason for call, and any transcript or summary of the actual call.

Phrases similar to a "payment processor" may include a company (e.g., a third party) appointed (e.g., by a merchant) to handle transactions. A payment processor may include an issuer, acquirer, authorizer and/or any other system or entity involved in the transaction process. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

What is claimed is:

1. A method, comprising:
   receiving, by a processor, a plurality of input files from multiple merchants, wherein the plurality of input files includes an input file;
   separating, by the processor, a transaction record from the input file to create a transaction message associated with a merchant, wherein the transaction message represents a transaction between the merchant and a consumer;
   marking, by the processor, the transaction message with a marker identifying a transaction characteristic of the transaction message;
   transmitting, by the processor, the transaction message to an input pipe of a plurality of input pipes, based on the marker associated with the transaction message;
   transmitting, by the processor, the transaction message to a processing machine, in response to the processing machine having processing information for the merchant and based on the processing machine being appropriate for the marker;
   updating, by the processor using an updating method of a synchronization system, the processing information to be a most recent processing information;
   applying, by the processor, a processing module to the transaction message based on the marker and input from a business rules engine using pre-defined logic;
   accessing, by the processor using application code, the most recent processing information in a memory of the processing module, in order to execute the processing module; and
   processing, by the processor, the transaction message by executing the processing module on the transaction message.

2. The method of claim 1, wherein the transaction characteristic includes a merchant identifier, a transaction account identifier associated with the consumer, a transaction date, a transaction time, a monetary amount and a location.

3. The method of claim 1, further comprising:
   producing, by the processor, a processed transaction message in response to the processing the transaction message, wherein the processed transaction message comprises the marker; and
   transmitting, by the processor, the processed transaction message to an external destination.

4. The method of claim 1, further comprising:
   producing, by the processor, a processed transaction message in response to the processing the transaction message, wherein the processed transaction message comprises the marker; and
   transmitting, by the processor, the processed transaction message to an output pipe associated with the marker.

5. The method of claim 4, wherein the transaction message is assembled into an output file in response to the transmitting the processed transaction message.

6. The method of claim 1, wherein the application code and the processing module do not access external databases for the processing information.

7. The method of claim 1, wherein the processing module is a discount/fee processing module based on a monetary amount and a date of the transaction.

8. An article of manufacture including a non-transitory, tangible computer readable storage medium having instructions stored thereon that, in response to execution by a processor, cause the processor to perform operations comprising:
- receiving, by the processor, a plurality of input files from multiple merchants, wherein the plurality of input files includes an input file;
- separating, by the processor, a transaction record from the input file to create a transaction message associated with a merchant, wherein the transaction message represents a transaction between the merchant and a consumer;
- marking, by the processor, the transaction message with a marker identifying a transaction characteristic of the transaction message;
- transmitting, by the processor, the transaction message to an input pipe of a plurality of input pipes, based on the marker associated with the transaction message;
- transmitting, by the processor, the transaction message to a processing machine, in response to the processing machine having processing information for the merchant and based on the processing machine being appropriate for the marker;
- updating, by the processor using an updating method of a synchronization system, the processing information to be a most recent processing information;
- applying, by the processor, a processing module to the transaction message based on the marker and input from a business rules engine using pre-defined logic;
- accessing, by the processor using application code, the most recent processing information in a memory of the processing module, in order to execute the processing module; and
- processing, by the processor, the transaction message by executing the processing module on the transaction message.

9. The article of claim 8, wherein the transaction characteristic includes a merchant identifier, a transaction account identifier associated with the consumer, a transaction date, a transaction time, a monetary amount and a location.

10. The article of claim 8, wherein the operations further comprise:
- producing, by the processor, a processed transaction message in response to the processing the transaction message, wherein the processed transaction message comprises the marker; and
- transmitting, by the processor, the processed transaction message to an external destination.

11. The method of claim 1, wherein the processing the transaction message comprises at least one of validating a date and a time of the transaction, a monetary amount of the transaction, a transaction account used for the transaction, applying discounts to the transaction, applying fees to the transaction, or determining a payment date for the transaction.

12. The article of claim 10, wherein the transaction message is assembled into an output file in response to the transmitting the processed transaction message.

13. The article of claim 8, wherein the application code and the processing module do not access external databases for the processing information.

14. The article of claim 8, wherein the processing module is a discount/fee processing module based on a monetary amount and a date of the transaction.

15. A system comprising:
- a processor; and
- a tangible, non-transitory memory configured to communicate with the processor,
- the tangible, non-transitory memory having instructions stored thereon that, in response to execution by the processor, cause the processor to perform operations comprising:
  - receiving, by the processor, a plurality of input files from multiple merchants, wherein the plurality of input files includes an input file;
  - separating, by the processor, a transaction record from the input file to create a transaction message associated with a merchant, wherein the transaction message represents a transaction between the merchant and a consumer;
  - marking, by the processor, the transaction message with a marker identifying a transaction characteristic of the transaction message;
  - transmitting, by the processor, the transaction message to an input pipe of a plurality of input pipes, based on the marker associated with the transaction message;
  - transmitting, by the processor, the transaction message to a processing machine, in response to the processing machine having processing information for the merchant and based on the processing machine being appropriate for the marker;
  - updating, by the processor using an updating method of a synchronization system, the processing information to be a most recent processing information;
  - applying, by the processor, a processing module to the transaction message based on the marker and input from a business rules engine using pre-defined logic;
  - accessing, by the processor using application code, the most recent processing information in a memory of the processing module, in order to execute the processing module; and
  - processing, by the processor, the transaction message by executing the processing module on the transaction message.

16. The system of claim 15, wherein the transaction characteristic includes a merchant identifier, a transaction account identifier associated with the consumer, a transaction date, a transaction time, a monetary amount and a location.

17. The system of claim 15, wherein the operations further comprise:
- producing, by the processor, a processed transaction message in response to the processing the transaction message, wherein the processed transaction message comprises the marker; and
- transmitting, by the processor, the processed transaction message to an external destination.

18. The system of claim 15, wherein the operations further comprise:
- producing, by the processor, a processed transaction message in response to the processing the transaction message, wherein the processed transaction message comprises the marker; and
- transmitting, by the processor, the processed transaction message to an output pipe associated with the marker.

19. The system of claim 18, wherein the transaction message is assembled into an output file in response to the transmitting the processed transaction message.

20. The system of claim 15, wherein the application code and the processing module do not access external databases for the processing information.

\* \* \* \* \*